Patented Apr. 10, 1934

1,954,381

UNITED STATES PATENT OFFICE 1,954,381

MANUFACTURE OF RUSTLESS IRON

Alexander L. Feild, Baltimore, Md., assignor to Alloy Research Corporation, Baltimore, Md., a corporation of Delaware No Drawing. Application August 10, 1932, Serial No. 628,186

7 Claims. (Cl. 75—22.5)

The present invention relates to the manufacture of low-carbon high-chromium steels of the type generally known as rustless or stainless iron, and particularly to a process for reclaiming rustless iron scrap. While the chemical composition of the low-carbon chromium alloy steels, herein designated as rustless irons, may vary considerably, it is common practice at the present time for such steels to contain in the neighborhood of .05 to .15% carbon and from 12 to 20% or more chromium. Other additional alloy elements may be present, such as, copper, nickel, tungsten, molybdenum, vanadium, etc., but in every case the corrosion-resistant property of the steel is primarily dependent on its chromium content.

The difficulties attendant upon remelting of rustless iron scrap by any of the commonly known procedures are thoroughly recognized by those skilled in the art, and, as a result, novel processes especially adapted to the purpose have been developed. For example, in my Patent No. 1,925,182 entitled Process for the manufacture of rustless iron, I have described a process whereby rustless iron scrap may be advantageously utilized in a process which involves the decarbonization of high-carbon ferrochrome, this last mentioned material being the well-known ferro-alloy containing, as a rule, from 4 to 6% carbon. In this former process commercially pure iron oxide, such as roll scale or magnetic iron ore concentrates, is used in large quantity as an oxidizing or decarburizing agent during the first stage of the process. In the second and final stage of this former process, lime and ferrosilicon are added to the bath to return metallic iron and chromium to the metal and thereby enrich the metal bath in chromium to the desired percentage. Carbon removal is confined to the first stage of the process and all of the chromium is incorporated in the bath at some time prior to the addition of lime and ferrosilicon.

The present process differs from this former process, as well as from other proposed processes, in that it does not involve removal of carbon from the metal bath, but instead is based on the principle of carbon exclusion. I have found that when rustless iron scrap is rapidly and continuously melted down in an electric arc furnace (with a minimum of interruption and restarting where carbon is directly picked up from the furnace electrodes contacting the melted metal) in the presence of an adequate quantity of iron oxide (the relative proportions of rustless iron scrap and iron oxide preferably being about four to one by weight), the scrap and oxide forming a bath of metal of increasing size covered by a strongly oxidizing slag maintained at high temperature, the carbon content of a sample taken from the metal bath at the time when melting is completed is no higher than that of the original scrap charge, and hence subsequent carbon removal is unnecessary. Furthermore, the absence of any charged material of relatively high carbon content, such as high-carbon ferrochrome, makes it possible to employ a smaller quantity of iron oxide. The use of a smaller quantity of iron oxide in turn calls for the employment of a smaller quantity of lime and reducing agent during the second or reducing stage of the present process and for this reason is a matter of very great practical importance.

I have found that ordinary commercial ferrochrome-silicon, which is itself a low-carbon product, may be employed to great advantage as a reducing agent, and that the quantity of chromium contained in such ferrochrome-silicon is generally sufficient to enrich the metal bath in chromium to the desired degree, i. e., up to that percentage of chromium present in the original rustless iron scrap or even higher when desired. I prefer to employ a ferrochrome-silicon containing approximately 50% silicon and 35% chromium, with a carbon content sufficiently low, preferably not over .15%, to avoid an increase in the carbon content of the metal bath.

In the practice of my process, therefore, the first or oxidizing stage is characterized by a substantial loss of chromium to the slag without effect on the carbon content of the metal bath. The second or reducing stage is characterized by removal of chromium and iron oxides from the slag and the return of these elements to the metal bath, and also by a supplementary enrichment of the metal bath in chromium. Since the initial charge of rustless iron scrap is low in carbon, as is likewise the reducing agent, and since there is no material change in carbon content during the oxidizing stage, I prefer to designate my process as one of carbon exclusion:

As an example of the practice of my process, the following illustrative heat will serve; 12,000 pounds of rustless iron scrap, analyzing .09% carbon and 17½% chromium, and 3,000 pounds of roll scale, analyzing 69% iron, were charged into a chromite lined six-ton Heroult carbon electrode arc furnace, power was applied and the charge was rapidly and continuously melted. The slag which forms from the iron oxide is a highly oxidizing slag and a considerable proportion of the chromium content of the scrap goes into the slag as chromium oxide. The rapidly melting charge forms a metal bath of increasing size covered by an oxidizing slag. The bath and slag are at a temperature somewhat higher than that commonly employed in ordinary electric steel melting practice, which I designate as "superheat". No reliable method is known to me for accurate determining the temperature of the metal bath under the slag blanket, but it is estimated that this temperature should be approximately 3050 to 3200° F., which is some 100 to 250° F. higher than that usually employed in ordinary electric steel melting practice. This superheat tends to make the iron oxide more energetic in combining with carbon coming from the furnace electrodes, as more fully described hereinafter, and thereby excluding it from the metal. By initially charging the furnace with substantially all of the scrap and roll scale comprising the melt-down charge, the melt-down or oxidizing period is continuous or substantially uninterrupted thereby permitting continual carbon exclusion during this stage of operation with a minimum of carbon pick-up from the electrodes. (By interrupting the melt-down, for the purpose of adding ingredients, for example, and then proceeding with the melt-down, at the instance of which the carbon electrodes are brought into intimate contact with bath and slag, great quantities of carbon are taken up by the metal which it is extremely difficult to subsequently oxidize from the bath).

As soon as the charge was thoroughly fused and the slag was in a fluid condition, a sample of metal taken from the furnace showed .10% carbon and 9.2% chromium. Immediately thereafter and preferably while metal and slag are at a temperature of superheat (because of the relatively high melting point of the reducing agent employed) there was charged onto the slag a mixture of 3,000 pounds of burnt lime and 1,300 pounds of ferrochrome-silicon, analyzing 49.5% silicon and 34.8% chromium, and about .12% carbon. The silicon of the ferrochrome-silicon combines with the oxygen of the iron and chromium oxides in the slag to reduce metallic iron and chromium into the metal. The chromium content of the ferrochrome-silicon contributes still further to the chromium content of the metal compensating for the dilution of the metal by the iron from the iron oxide and ferro-chrome-silicon employed and even permitting a chromium content higher than that of the iron-chromium scrap in the initial charge. The lime serves to accelerate the reducing action by combining with silica formed by the oxidation of the silicon.

When reduction of the iron and chromium oxides in the slag had been substantially completed, the usual finishing additions of lump ferro-silicon and low-carbon ferromanganese were added to the bath and the metal was tapped into the ladle. The product of the heat weighed 15,200 pounds and analyzed .09% carbon, 16.9% chromium, .40% silicon, .40% manganese, with phosphorus and sulphur in normal amounts.

In the practice of my invention I prefer to employ an electric furnace of the well-known Heroult type lined to a height of somewhat above the slag line, with chromite brick carrying a superimposed rammed-in and formed bottom composed of approximately 3 parts by weight of crushed chromite ore and 1 part of ground magnesite. Sodium silicate serves as a good binder for this rammed-in part of the bottom lining. The chromite bottom has a long life due to its refractory nature and its decreased tendency, as compared with other lining materials, in the matter of absorption of iron from the molten metal and the attack on this iron by the oxidizing slag. The use of the chromite bottom tends to improve the quality of the metal since the quantity of included oxides is decreased in accordance with the decrease in attack on the lining, as well as to maintain the chromium content of the metal. The side walls and the roof may be of silica brick in accordance with ordinary practice.

The iron oxide of the roll scale is an energetic oxidizing agent. Its presence in the slag on the molten metal serves as a carbon oxidizing barrier to prevent the carbon from the electrodes from getting into the metal. The iron oxide in the charge also tends to oxidize any carbon which may get to the charge from the electrodes in the initial stages of the meltdown before the formation of the iron oxide-containing meltdown slag. By the term "carbon electrodes", I intend to include electrodes made of different varieties of carbon, such as coke, graphite, etc.

While I prefer to use roll scale because of its high iron oxide content, other materials high in iron oxide may be used, such, for example, as a magnetic iron ore concentrate, or a rich iron ore.

The process in which the chromium is supplied entirely from the rustless iron scrap and the ferrochrome-silicon addition, adapts itself readily to the manufacture of rustless irons containing about 10 to 20% chromium. However, in the case of irons containing more than about 20% chromium, difficulty may be experienced due to large slag volume during the melt down or during the progress of the first or oxidizing stage. Therefore, when the desired chromium content is to exceed about 20%, I prefer to enrich the metal bath in chromium beyond this percentage by means of an addition or additions of a mixture of chrome ore and a suitable low-carbon silicon reducing agent. Such a mixture of chrome ore and reducing agent is added to the bath along with or in the presence of a basic material such as burnt lime after the completion of the oxidizing period, and the reduction of the chrome ore proceeds side by side with the reduction of the chromium and iron oxides already present in the slag and originally present as metals in the rustless iron scrap charge. I do not restrict myself, however, to this supplementary chrome ore addition solely for steels containing more than 20% chromium.

While I may use ordinary 50% ferrosilicon, ferrosilicon containing other percentages of silicon may be used, or even silicon metal. Also, while I much prefer to use a silicon-containing reducing agent, other exothermic reducing agents may be employed, such, for example, as aluminum, magnesium, or the like.

When it is desired to reclaim, for example, rustless iron scrap of the well-known "18—8" type, which contains about 18% chromium and 8% nickel, it is necessary to add metallic nickel in some form or other in order to avoid a lowering of the nickel content of the metal bath by dilution. I prefer electrolytic nickel for this purpose, although nickel oxide may be employed. In either case the addition may be made to the original charge.

While I have described the preferred embodiment of my invention and have cited specific examples showing how it is formed, it is to be understood that the invention is not so limited but may be otherwise embodied and practiced within the scope of the following claims.

I claim:

1. The process of making rustless iron in an electric arc furnace of the Heroult type having carbon electrodes, which comprises rapidly and continuously melting down at high temperature a charge consisting principally of low-carbon rustless iron scrap and a material high in iron oxide to form a bath of metal of increasing size covered by an oxidizing slag maintained at high temperature, whereby the carbon in the electrodes is substantially excluded from the metal, and thereafter, while said slag and metal are at a temperature of superheat, adding a chromium-containing reducing agent to the slag to directly add chromium to the metal and to reduce metallic iron and chromium from their oxides in the slag into the metal.

2. The process of making rustless iron in an electric arc furnace of the Heroult type having carbon electrodes, which comprises continuously melting down a charge consisting principally of low-carbon rustless iron scrap and a material high in iron oxide to form a bath of metal of increasing size covered by an oxidizing slag maintained at high temperature, whereby the carbon in the electrodes is substantially excluded from the metal, and thereafter, while said slag and metal are at a temperature of superheat, adding ferrochrome-silicon to the slag, whereby metallic iron and chromium are reduced from their oxides in the slag into the metal and further chromium is added from the chromium content of the ferrochrome-silicon.

3. The process of making rustless iron in an electric arc furnace of the Heroult type having carbon electrodes, which comprises continuously melting down at high temperature a charge consisting principally of low-carbon rustless iron scrap and a material high in iron oxide in relative proportions by weight of about four to one to form a bath of metal of increasing size covered by an oxidizing slag maintained at high temperature, whereby the carbon in the electrodes is substantially excluded from the metal, and therafter adding chrome ore and a silicon reducing agent to the bath to enrich the metal with chromium.

4. In the production of rustless iron in an electric arc furnace of the Heroult type having carbon-containing electrodes, the art which includes, continuously melting iron-chromium scrap beneath an iron oxide slag and at high temperature whereby carbon contamination of the metal by said electrodes is effectively precluded, this action being accompanied by the oxidation of chromium from the metal, the oxides entering the slag; and then adding to said slag and metal, while at a temperature of superheat, a chromium containing reducing agent of low carbon content thereby reducing chromium oxides of said slag and permitting a chromium enrichment of the metal as well as achieving a direct chromium contribution from said agent.

5. In the production of rustless iron in an electric arc furnace of the Heroult type having carbon electrodes, the art which comprises, continuously melting iron-chromium scrap in the presence of an iron oxide slag and at a temperature of superheat, thereby permitting the exclusion of carbon from the melted metal although fostering the oxidation of chromium from the same, the chromium oxide entering the slag; and then adding to said slag and metal, while at a high temperature, ferro-chrome-silicon whereby the metal is directly enriched in chromium and whereby the chromium oxides contained in said slag and metal are reduced to further enrich said metal.

6. In the production of rustless iron in an electric arc furnace of the Heroult type having carbon electrodes, the art which comprises, continuouslyk melting chromium containing rustless iron scrap in the presence of a strongly oxidizing slag and at high temperature whereby carbon is excluded from the melted metal and chromium is oxidized and enters the slag and metal, and then adding to said slag a mixture including a reducing agent and chromium in combined form to reduce the oxides of chromium supplied the slag and thereby enrich the metal.

7. In the production of rustless iron in an electric arc furnace of the Heroult type having carbon electrodes, the art which comprises rapidly and continuously melting down at a high temperature a charge consisting principally of rustless iron scrap and iron oxide in relative proportions of about four to one by weight, thereby forming a bath of metal of increasing size covered by a strongly oxidizing slag maintained at a temperature of superheat, whereby the carbon in the electrodes is substantially excluded from the metal, and after complete melt-down, adding a silicon containing reducing agent to the slag to reduce metallic iron and chromium from their oxides in the slag into the metal.

ALEXANDER L. FEILD.